(12) United States Patent
Riepe et al.

(10) Patent No.: US 7,951,231 B2
(45) Date of Patent: May 31, 2011

(54) LIQUID RELEASE AGENT

(76) Inventors: Hans Riepe, Bünde (DE); Angelika Riepe, Bünde (DE)

( * ) Notice: Subject to any disclaimer, the term of this patent is extended or adjusted under 35 U.S.C. 154(b) by 0 days.

(21) Appl. No.: 12/281,375

(22) PCT Filed: Dec. 19, 2006

(86) PCT No.: PCT/EP2006/069938
§ 371 (c)(1),
(2), (4) Date: Dec. 9, 2008

(87) PCT Pub. No.: WO2007/101489
PCT Pub. Date: Sep. 13, 2007

(65) Prior Publication Data
US 2010/0024684 A1 Feb. 4, 2010

(30) Foreign Application Priority Data

Mar. 3, 2006 (DE) .................. 10 2006 009 940

(51) Int. Cl.
*C09D 5/20* (2006.01)
*C10M 111/02* (2006.01)
(52) U.S. Cl. ....... 106/2; 106/285; 106/287.26; 106/311; 252/364; 208/14; 208/18; 508/110
(58) Field of Classification Search ............ 106/2, 285, 106/287.26, 311; 252/364; 208/14, 18; 508/110
See application file for complete search history.

(56) References Cited

U.S. PATENT DOCUMENTS

| | | | |
|---|---|---|---|
| 3,424,849 A | 1/1969 | Conklin et al. | |
| 4,155,770 A | 5/1979 | Doumani | |
| 4,781,757 A | 11/1988 | Lamb | |
| 6,063,177 A * | 5/2000 | Meda et al. | 106/38.25 |

FOREIGN PATENT DOCUMENTS

| | | |
|---|---|---|
| DE | 203 14 849 U1 | 12/2003 |
| DE | 103 43 441 B3 | 5/2005 |
| GB | 2081299 A * | 2/1982 |

OTHER PUBLICATIONS

Derwent-Acc-No. 1986-285053, abstract of German Patent Specification No. DD237080A (Jul. 1986).*
Wenske, Gerhard "Dictionary of Chemistry—German-English", "Spezialbenzin", p. 1621, col. 2. VCH ISBN 0-89573-527-X (NY) (1994). [no month].*

* cited by examiner

*Primary Examiner* — Anthony J Green
(74) *Attorney, Agent, or Firm* — Henry M. Feiereisen; Ursula B. Day

(57) ABSTRACT

A liquid release agent for application in particular to a panel edge region provided, or to be provided, with a coating by means of an adhesive or by means of glue, the panel preferably being a furniture panel, and the agent comprising a white oil as its carrier fluid, is configured such that the release agent comprises an alcoholic solution.

3 Claims, No Drawings

LIQUID RELEASE AGENT

BACKGROUND OF THE INVENTION

The invention relates to a liquid release agent having white oil as carrier fluid for application in particular onto an edge region of a panel, preferably a furniture panel, which edge region is provided or to be provided with a coating by means of an adhesive or by means of a glue.

Such a release agent is known from DE 203 14 849 U1. This release agent has basically been proven in practice.

This release agent finds preferred use in the prevention of adhesive or glue residues to adhere on the furniture panel, when its edges are coated with an edge strip.

Applications have been known, however, for which the known release agent does not provide optimum results.

In view of its fairly high proportion of low-boiling special boiling-point gasoline ("Spezialbenzin") as solvent, the known release agent can further pose a health hazard, especially when there is no sufficient removal by suction, as is oftentimes the case in the entry region of an edge processing machine.

The known release agent also impedes an optimization of the operation because the high proportion of special boiling-point gasoline causes on the furniture panel that has been wetted with the release agent, evaporation edges which are very difficult to remove. As the furniture panels being processed involve serial products produced on a large scale, this drawback is especially relevant, in particular in connection with resultant high refinishing costs.

SUMMARY OF THE INVENTION

The invention is based on the object to provide an improved release agent.

This object is solved by a release agent having white oil as carrier fluid, for application in particular onto an edge region of a panel, preferably a furniture panel, which edge region is provided or to be provided with a coating by means of an adhesive or by means of a glue, characterized in that the release agent contains an alcoholic solution.

The preferred ethanol solution is comprised of ethanol and a low-boiling special boiling-point gasoline with an evaporation number of 6-10, preferably of 6-8. The ethanol has also this evaporation number.

It has been shown that the proportion of the low-boiling special boiling-point gasoline at ≦10% results in a preferred alcoholic solution or ethanol solution which is present in the release agent in a concentration of 85%-99%, while white oil as carrier fluid is present in a concentration of 15% to 1%.

Besides being very reliable in use, the novel release agent has a number of further advantages. The release agent with the ingredient ethanol solution does not pose a health hazard (Xn according to the Safety Data Sheet 91/155/EWG), is not harmful to the environment (N), and does not cause skin irritation (R 38).

The oftentimes absence of a removal by suction in the entry region of the coating device does not adversely affect the health, whereby even breathing in of ambient air poses no problem whatsoever for the personnel. This is due in particular as a consequence of the slight proportion of special boiling-point gasoline which is at ≦10%.

The release agent is suitably applied via fine nozzles which are arranged in the entry region of the coating device.

The lower explosion limit increases from presently 0.9 vol.-% to 2.6 vol.-% so that safety is substantially improved. As a result, the release agent can be applied with less air, when applied onto the edge region of the panel by means of an atomization nozzle.

This has an impact on the operation as a whole in so far as a greater safety is established, when a change in the supply of air or release agent is encountered, i.e. there is no need to keep the supply of air or release agent within narrow limits, as has been the case heretofore to eliminate the risk of explosion.

Furthermore, as the ignition temperature of the novel release agent is about 425° C., as opposed as being about 250° C. conventionally, the operating safety is necessarily also improved, especially with respect to a decreased risk of explosion.

It has been surprisingly found that the novel release agent also decreases stress on the production facility in which the release agent is employed, because the mounted structural components of the production facility, which are made in particular of plastic or rubber, can no longer be damaged.

The mentioned slight proportion of special boiling-point gasoline does not leave any evaporation edges during evaporation, so that the need for a later cleaning of the furniture panel is eliminated, resulting in not insignificant cost savings.

Still, the desired effect of the release agent is maintained without restrictions, i.e. glue or adhesive escaping during coating of the panel edges is effectively prevented to adhere to the panel edge region previously wetted with the release agent, just like the known release agent referred to in the introductory part of the specification, so that glue or adhesive residues can be removed in a simple manner.

The same holds true for the removal of chips which are encountered during a subsequent edge treatment, especially chips caused by milling, and which are prevented from adhering because the alcoholic solution has evaporated by the time the chips accumulate and the amount of white oil is too small to bind the chips.

The white oil used as release fluid may be made of medical or technical white oil which is positively non-toxic and does not pose any health hazard for persons using the release agent.

BRIEF DESCRIPTION OF THE DRAWING

None

DETAILED DESCRIPTION OF PREFERRED EMBODIMENTS

None

What is claimed is:

1. A liquid release agent, comprising:
   white oil as carrier fluid at a concentration of 15% to 1% by volume of a total amount of the release agent; and
   an alcoholic solution added to the white oil at a concentration of 85% to 99% by volume of a total amount of the release agent and comprised of special boiling-point gasoline and alcohol, wherein the special boiling-point gasoline has an evaporation number of 6-10 and is contained in a concentration of greater than 0 to ≦10% by volume in the alcoholic solution.

2. The release agent of claim 1, wherein the alcohol is ethanol.

3. The release agent of claim 1, wherein the special boiling-point gasoline has an evaporation number of 6-8.

* * * * *